(12) United States Patent
Bodor et al.

(10) Patent No.: US 7,885,010 B1
(45) Date of Patent: Feb. 8, 2011

(54) ENDOSCOPE OBJECTIVE LENS AND METHOD OF ASSEMBLY

(75) Inventors: Peter Pal Bodor, Pembroke Pines, FL (US); Jurgen Zobel, Pembroke Pines, FL (US); Daniel Lullie, Pembroke Pines, FL (US)

(73) Assignee: Integrated Medical Systems International, Birmingham, AL (US)

( * ) Notice: Subject to any disclaimer, the term of this patent is extended or adjusted under 35 U.S.C. 154(b) by 318 days.

(21) Appl. No.: 12/013,690

(22) Filed: Jan. 14, 2008

(51) Int. Cl.
G02B 21/02 (2006.01)
G02B 9/60 (2006.01)
G02B 9/34 (2006.01)

(52) U.S. Cl. .................. 359/660; 359/659; 359/770; 359/781

(58) Field of Classification Search .......... 359/659, 359/660, 770, 781, 811, 819, 829, 830
See application file for complete search history.

(56) References Cited

U.S. PATENT DOCUMENTS

| | | | |
|---|---|---|---|
| 5,515,208 A | 5/1996 | Yamamoto et al. | |
| 5,587,839 A | 12/1996 | Miyano et al. | |
| 5,777,797 A | 7/1998 | Miyano | |
| 5,916,148 A | 6/1999 | Tsuyuki | |
| 5,936,778 A | 8/1999 | Miyano et al. | |
| 6,994,668 B2 | 2/2006 | Miyano | |
| 7,027,231 B2 | 4/2006 | Miyano | |
| 7,218,454 B2 | 5/2007 | Miyano | |
| 7,422,382 B2 * | 9/2008 | Seo | 396/529 |

* cited by examiner

*Primary Examiner*—William C Choi
(74) *Attorney, Agent, or Firm*—C. Brandon Browning; Maynard Cooper & Gale, PC

(57) ABSTRACT

A wide field video endoscope objective and method of assembly the objective including four groups with five lenses, a mechanical housing containing the entire image forming elements, a aperture stop, a centering member and a retainer sleeve. The centering member is at first centered over the photo sensitive area of the chip and bonded to the surface of the cover glass. The retainer sleeve slides over said centering member and is glued to the centering member and the housing of the video chip. The objective housing with the optical elements is screwed on the centering member to adjust for focusing.

28 Claims, 7 Drawing Sheets

ENDOSCOPE OBJECTIVE LENS AND METHOD OF ASSEMBLY

FIELD OF INVENTION

The present invention relates to an objective lens and method of assembly. More particularly, the invention relates to a compact, wide field video endoscope including an objective barrel containing a set of five image forming lenses and a centering assembly readily connectable between the objective barrel and a video chip for optically aligning the image forming elements with the video chip.

BACKGROUND OF THE INVENTION

Many endoscopic applications require an endoscope that is sufficiently flexible for allowing the endoscope to travel through the curved passageways inside the body. For decades, physicians have used endoscopes that rely on flexible image and illumination bundles with loose glass fibers. In a short rigid portion at the tip of such endoscopes is an objective lens connected to the image bundle. The length of this rigid tip is crucial for the flexibility and maneuverability of the endoscope inside the body. Various types of objective lenses for these flexible fiber endoscopes are known.

With the miniaturization of video chips, flexible endoscopes with a chip at the tip of the endoscope became possible and new requirements for objective lenses for video endoscopes emerged. In video endoscopes the image sensor portion is connected to other electronic elements inside the housing of the chip. This chip housing contributes significantly to the length of the rigid portion at the tip of the flexible video endoscope. To keep the overall length of the rigid portion of this tip short, extreme length constraints have arisen for the construction of the objective lens for such video endoscopes.

Making this task more difficult is that video chips require an objective lens with a wide field of view and an even performance over the full chip format. That is because flexible video endoscopes operate in very narrow body cavities where orientation within these narrow body cavities is difficult. As such, video endoscopes require a large field of view in order to overview a large portion of the body cavity. The required field of view on the object side can be up to 155°. Adding to the difficulty of designing video endoscopes is the variable brightness in body cavities and the differing colors of the walls of the various body cavities. Thus, the numerical aperture or so-called F-number of the objective lens of a video endoscope must be adapted for use under these varying conditions. For example, an objective lens should work up to an F-number of 5.6 with diffraction limited resolution over the whole field. For better illuminated body cavities the F-number can be reduced to achieve a larger depth of field.

For practical reasons the last surface of the objective lens needs a minimum distance to the video chip and in particular the video chip cover glass. Any surface imperfection close to the video chip can cause a spot to appear within the image area. To focus an image on the video chip, the objective lens has to be moved backward and forward relative to the video chip to find the best focus. The objective lens for a video endoscope also has to be aligned with the center of a photo sensitive area of the video chip. The center of the photo sensitive area of the chip is not aligned to any outer dimensions of the chip housing. Thus, the objective lens has to be aligned optically to the photo sensitive area and not to the video chip housing.

SUMMARY OF THE INVENTION

The present invention is directed to a wide field video endoscope objective lens and method of assembly including the following four groups with five lenses: a plan concave lens with the concave surface facing the image side, a plan convex lens with the convex side facing the object side, an aperture stop, a plan convex lens with the convex side facing the image side and an achromatic lens composed of bi-convex lens cemented to a plan concave lens, a mechanical housing containing all the image forming elements and the aperture stop, a centering member which is at first centered over a photosensitive area of a video chip and bonded to the surface of a video chip cover glass for holding the mechanical housing with the lenses centered to the photosensitive area, and a retainer sleeve which slides over the centering member and is glued to the centering member and the housing of the video chip. The optical and mechanical design and the method of assembly of the present invention result in a compact objective lens for video endoscopes having a high optical performance. The construction is easily aligned and assembled, robust and withstands day to day rough handling in the hospital environment.

DETAILED DESCRIPTION OF PREFERRED EMBODIMENT

Figure 1:
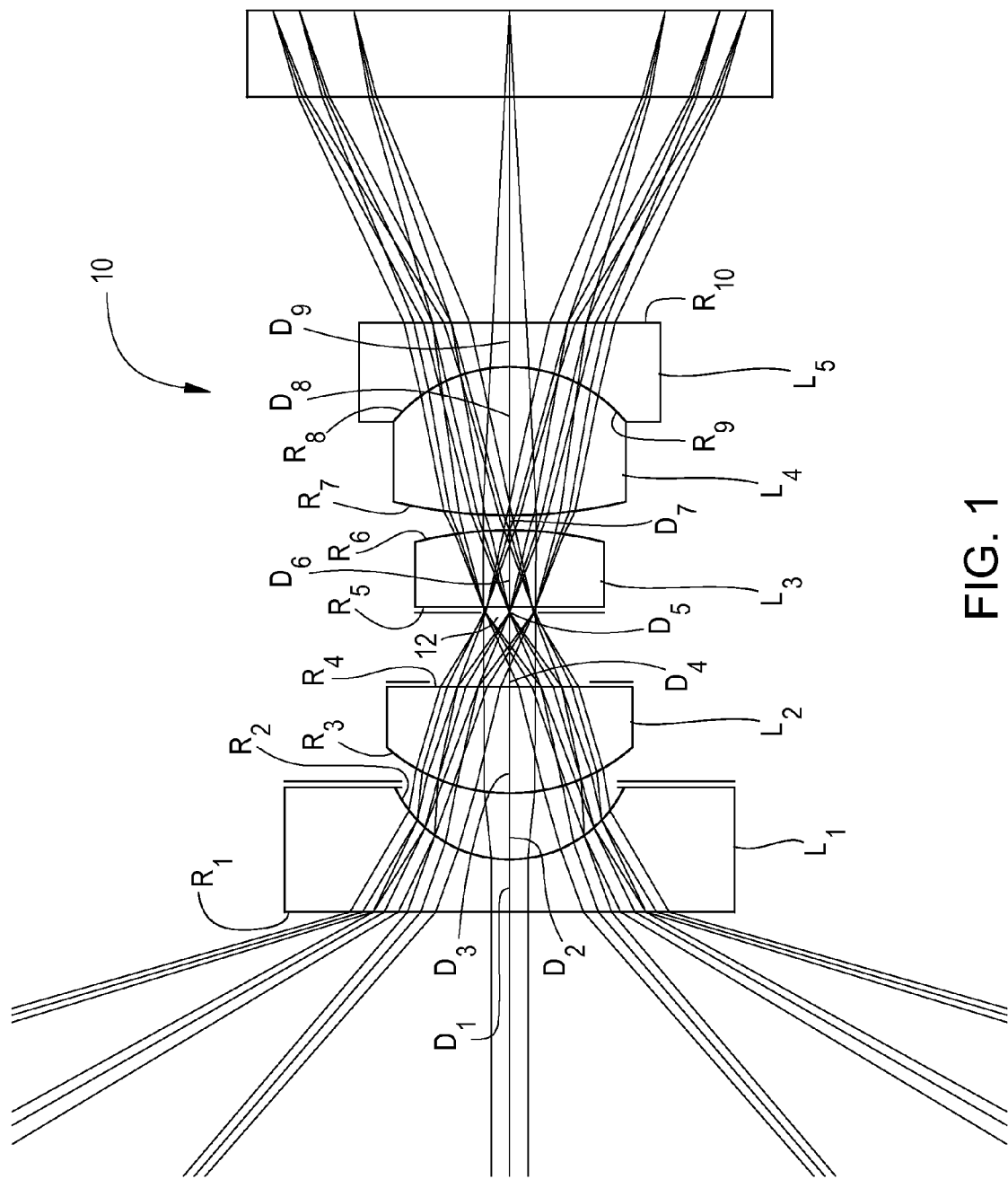
FIG. 1 is a schematic drawing showing the constitution of an endoscope objective lens in accordance with a preferred embodiment of the present invention.

FIG. 1 depicts an endoscope objective lens 10 in accordance with a preferred embodiment of the present invention.

Objective lens 10 is configured to project a field of 155° on a format of 2.7 mm diameter. To that end, objective lens 10 includes a first lens $L_1$ made of a plan concave lens having a concave surface facing an image side, a second lens $L_2$ made of a plan convex lens having a convex side facing an object side and a third lens $L_3$ made of a plan convex lens having a convex side facing the image side. In addition, there is provided an achromatic lens composed of a fourth lens $L_4$ made of a bi-convex lens and a fifth lens $L_5$ made of plan concave lens having a concave surface that faces the object side. Fourth lens $L_4$ and fifth lens $L_5$ are cemented together and provide two lenses with high refractive indexes but with a low refractive index difference between the two lenses. The strong curvature of the cemented surface compensates higher order aberrations accumulated in the single lens elements.

An aperture stop 12 is placed between second lens $L_2$ and third lens $L_3$. The aperture stop is the location where the rays of all image points converge. Accordingly, those lenses close to aperture stop 12, namely second lens $L_2$ and third lens $L_3$, are held small in diameter and overall length. Those lenses that are further away from aperture stop 12, namely first lens $L_1$, fourth lens $L_4$ and fifth lens $L_5$, are increased un-proportionally in diameter and overall length based on their distance from the aperture stop. This is especially extreme for wide field lenses which are needed in flexible endoscopes. For this reason, aperture stop 12 is located close to the middle of the four group lens system, with two groups on each side of the aperture stop to minimize the diameter and overall length of all the lenses in the objective system.

Preferably, first lens $L_1$, second lens $L_2$, third lens $L_3$, fourth lens $L_4$ and fifth lens $L_5$ are made from lanthanide crown glass, lanthanide flint glass or plain Schwer-Flint (SF) glass or lanthanide SF glass having refractive indices $n_d > 1.695$. In general, refracting power of a lens is the product of the curvature and the difference of the refractive index and the surrounding medium. When the refractive index difference is high, the curvature can be lower for a given refracting power thus shortening the lens. When the curvature is lower, the radius of the lens surface can be flatter. Further, the center thickness of a positive plan convex lens such as second lens $L_2$ or third lens $L_3$ can be reduced to reduce the overall length of an optical system. However the center thickness is limited by a reasonable edge thickness. Thus, a plan convex lens with the same refractive power can be shorter if the refractive index of the glass is higher.

The same proportions hold true for a negative plan concave lens, such as first lens $L_1$, where the overall length is determined by the edge thickness of the plan concave lens and the center thickness can only be reduced until a minimum center thickness is reached. For a given negative refractive power a high refractive index allows a flat concave radius and consequently a shorter lens element. Beyond that, aberrations of higher order are introduced by the amount of curvature of a given lens. A lens with a flat radius and a high refractive index contributes significantly less aberrations of higher order than a lens with stronger curved radius and low refractive index. Thus, using high refractive index glasses significantly shortens the overall lengths and improves overall image quality of objective lens 10.

Figure 2:
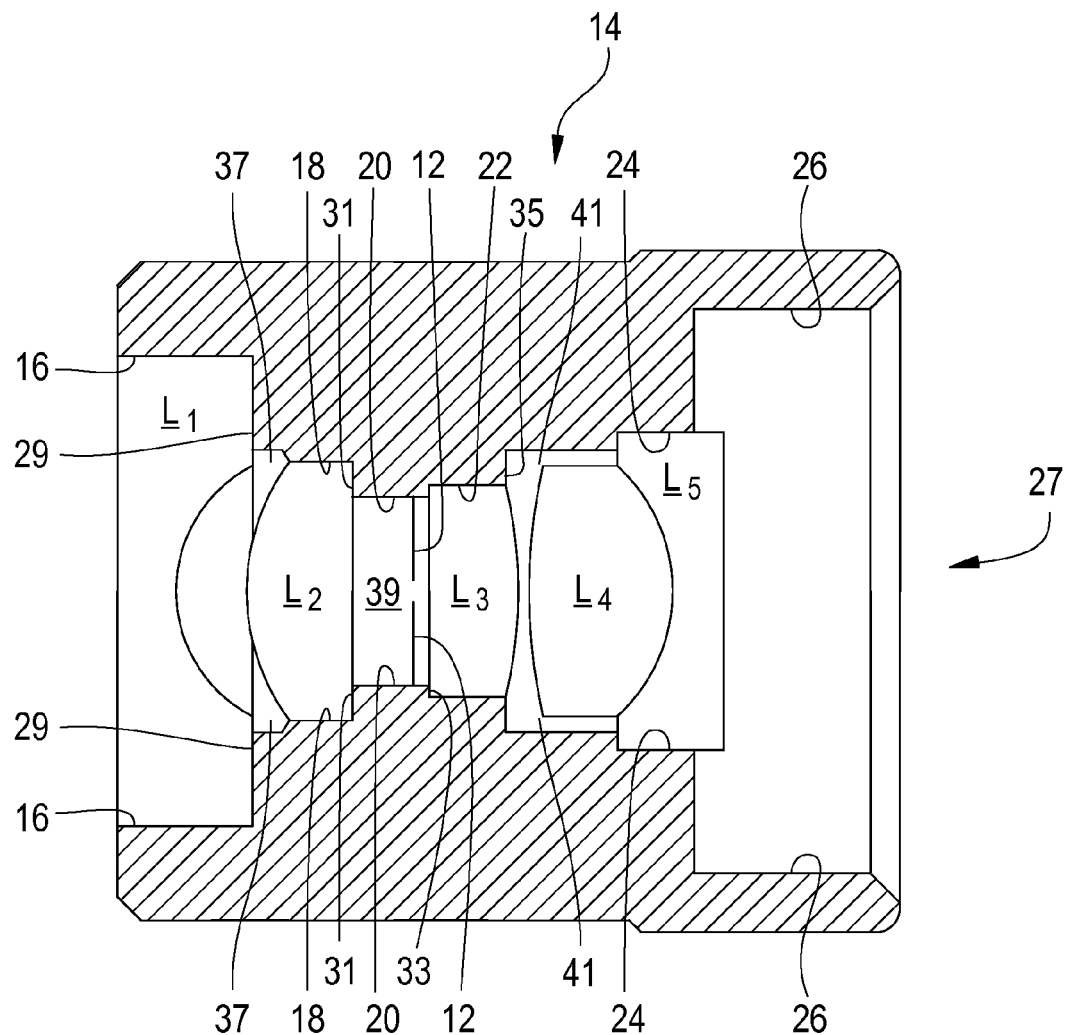
FIG. 2 is a sectional view of an objective barrel in accordance with the preferred embodiment of the present invention containing the endoscope objective lens of FIG. 1.

FIG. 2 depicts an objective barrel 14 containing objective lens 10 in accordance with the preferred embodiment of the present invention. Objective barrel 14 is formed from a single piece having a passageway there through and defining an interior volume for containing objective lens 10. Successively from the object side to the image side of barrel 14, the interior volume of objective barrel 14 includes a first lens seat 16, a second lens seat 18, an aperture stop seat 20, a third lens seat 22 and an achromatic lens seat 24 for holding fourth lens $L_4$ and fifth lens $L_5$ and an opening 27. Each of seats 16, 18, 20, 22 and 24 is circular having a circumference that is essentially the same as the lens or aperture stop received by the seat. Each of seats 16, 18, 20, 22 and 24 also includes a respective-edge 29, 31, 33 and 35 that acts to prevent reflections projected from objective barrel 14 from being projected through the barrel. These seats are sometimes referred to in the art as masks. Objective barrel 14 further includes on the image side of fifth lens $L_5$ a continuous threaded wall 26 and an opening 27.

To assemble objective lens 10 within objective barrel 14 two lens elements are assembled from each side into objective barrel 14. They are either individually glued to the objective barrel where the optical glue forms a layer around the cylinder of the lens thereby centering the lens in the respective mechanical seats of objective barrel 14 or a mechanical spacer is used to hold the inner, smaller elements in place while glue is used to secure the outer lens to objective barrel 14. The outer lenses then hold the inner lenses in place. This simplifies the assembly of the lens elements in the objective barrel.

More particularly, to assemble objective assembly 10 within objective barrel 14, aperture stop 12 is first placed and glued into aperture stop seat 20. Thereafter, second lens $L_2$ and third lens $L_3$ are seated into second lens seat 18 and third lens seat 22, respectively, followed by the seating of first lens $L_1$ into first lens seat 16 and fourth lens $L_4$ and fifth lens $L_5$ into achromatic lens seat 24. First lens $L_1$ and fourth lens $L_4$ and fifth lens $L_5$ are glued into place. Second lens $L_2$ and third lens $L_3$ can be glued into place or held in place by respective spacers placed between first lens $L_1$ and second lens $L_2$ at 28 and third lens $L_3$ and fourth lens $L_4$ at 30. Once seated into their respective seats within objective barrel 14, lens $L_1$ through $L_5$ do not move relative one another. Further, with lenses $L_1, L_2 L_3$ and $L_4$ secured in place, air gaps 37, 39 and 41 are formed within barrel 14.

Figure 3:
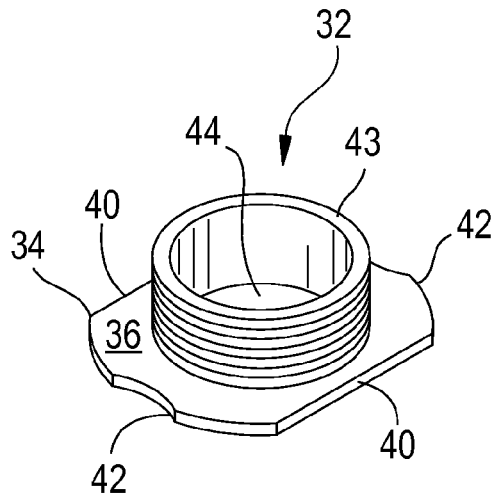
FIG. 3 is a perspective view of a centering member of an endoscope objective lens centering assembly in accordance with the preferred embodiment of the present invention.

FIG. 3 depicts a centering member 32 of an endoscope objective lens centering assembly in accordance with the preferred embodiment of the present invention. Centering member 32 includes a substantially flat plate 34 having a top side 36, a bottom side, a pair of opposing substantially straight edges 40 and a pair of opposing rounded edges 42. Extending perpendicularly from the center of top side 36 is a cylinder 43 having a passageway 44 that extends through plate 34. The exterior of cylinder 43 is threaded and configured to be received by continuous threaded wall 26 of objective barrel 14.

Figure 4:
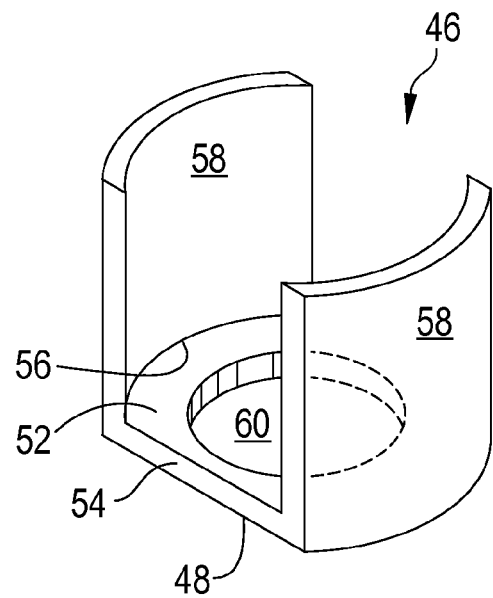
FIG. 4 is a perspective view of a retainer sleeve of an endoscope objective lens centering assembly in accordance with the preferred embodiment of the present invention.

FIG. 4 depicts a retainer sleeve 46 of an endoscope objective lens centering assembly in accordance with preferred embodiment of the present invention. Retainer sleeve 46 includes a substantially flat plate 48 having a top side 50, a bottom side 52, a pair of opposing substantially straight edges 54 and a pair of opposing rounded edges 56. Extending perpendicularly from pair of opposing round edges 56 and bottom side 52 are a pair of opposing rounded arms 58. Arms 58 of retainer sleeve 46 are configured to slide over centering member 32 and adjacent to pair of opposing rounded edges 42 thereof, with pair of opposing rounded edges 56 of retainer sleeve 46 loosely engaging with pair of opposing rounded edges 42. Retainer sleeve 46 further includes an opening 60 through the center of flat plate 48 that is configured to sit loose over cylinder 43 of centering member 32.

Figure 5:
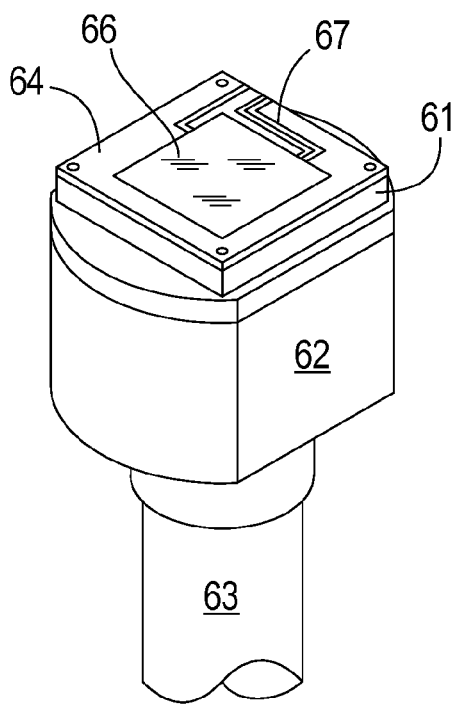
FIG. 5 is a perspective view of a video chip, video chip housing and associated video signal cable.
Figure 6:
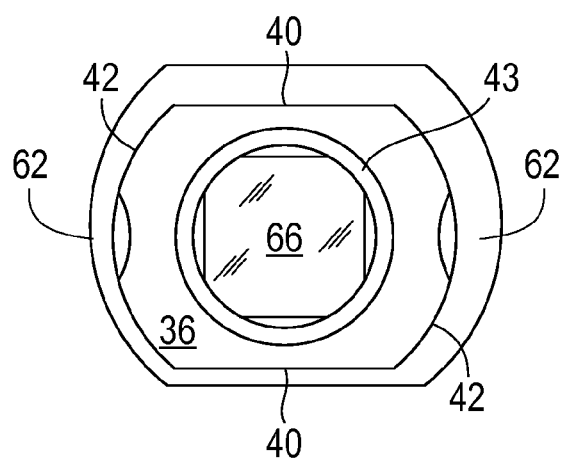
FIG. 6 is a top plan view of the centering member of FIG. 3 coupled to a video chip cover glass of the video chip of FIG. 5.
Figure 10:
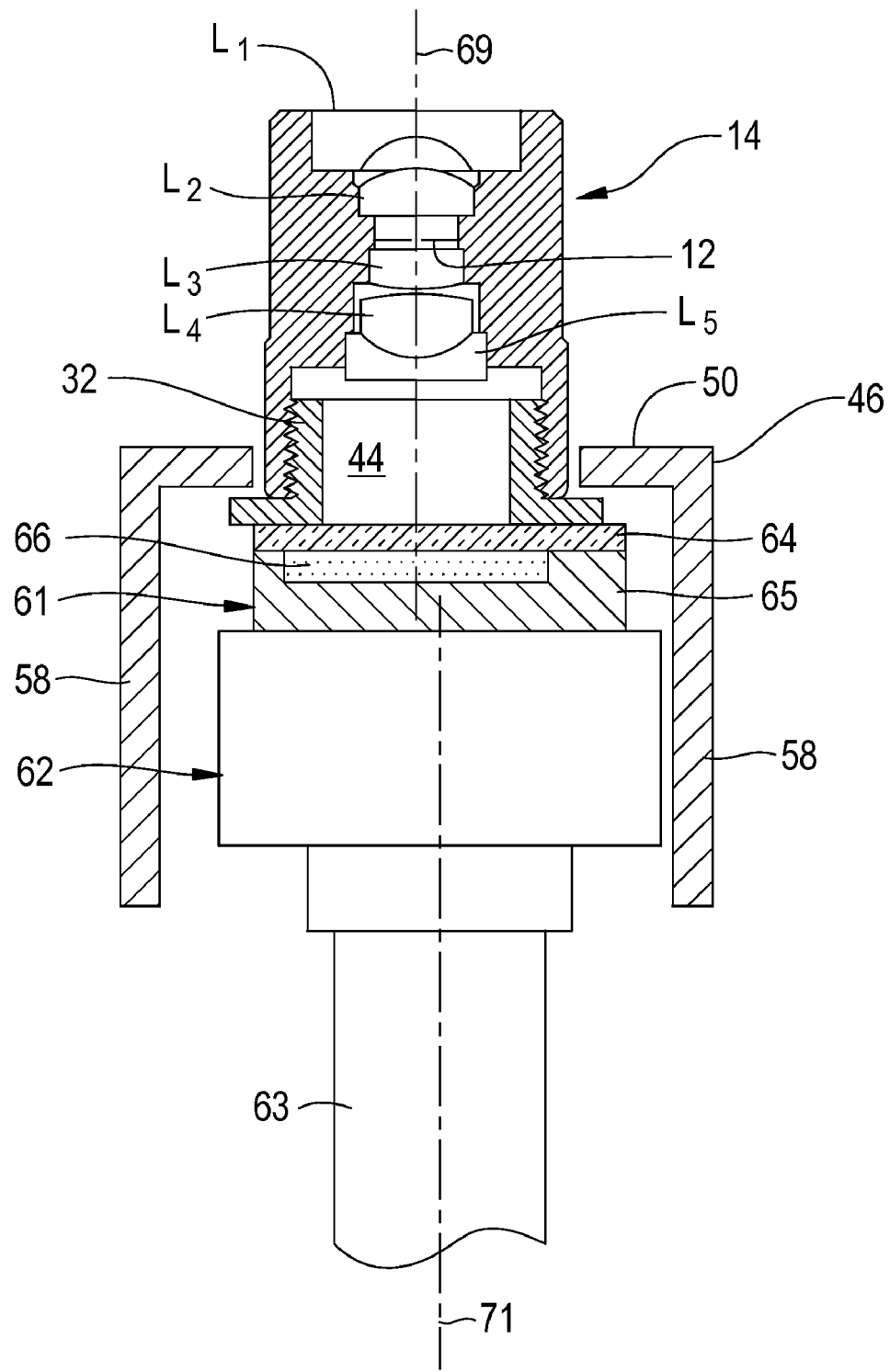
FIG. 10 is a sectional view of the endoscope objective lens centering assembly depicted in FIG. 9.

FIGS. 5, 6 and 10 depict a video chip 61, video chip housing 62 and associated video signal cable 63 to which objective barrel 14 can be coupled. Video chip 61 includes a base 65 consisting of a quartz plate having a set of conductive metal lines 67 supported thereon for reading out an image signal. The conductive metal lines establish a rectangular photosensitive area 66 with a horizontal to vertical ratio of 4:3. Since quartz plate is roughly centered on chip housing 62, being off-set in the range of 0.1 millimeter, photosensitive area 66 is not geometrically in the middle of video chip 61. Thus, an optical axis 69 of photosensitive area 66 is not aligned with the axis 71 of video chip housing 62. This is the primary reason the objective barrel centering assembly is required. Preferably, video chip 61 has a format diagonal of 3 mm. A glass cover plate 64 is shown placed over and coupled to photosensitive area 66 of video chip 61. To align the optical axis of objective barrel 14 relative to the optical axis 69 of photosensitive 66 area of chip 61 centering member 32 is first coupled to glass cover plate 64.

Figure 7:
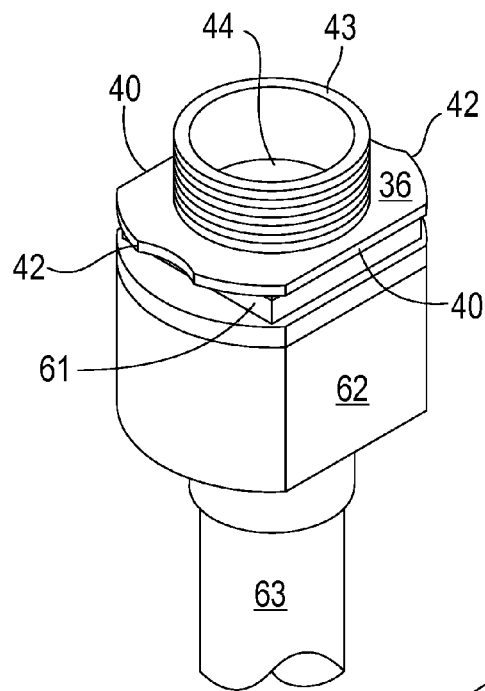
FIG. 7 is a perspective view of the endoscope objective lens centering assembly depicted in FIG. 6.

More particularly, as depicted in FIGS. 6 and 7, centering member 32 is placed over photosensitive area 66 of video chip 61 onto glass cover plate 64 with the bottom side of centering member 32 being placed against glass cover plate 64. So that centering member 32 can be off set from the axis 71 of video chip housing 62 without extending over the edge of video chip housing 62, flat plate 34 is smaller than the surface of video chip housing 62 on which centering member 32 is supported. Passageway 44 is then centered over photosensitive area 66 under optical control using a sharp edge around passageway 44 for alignment. This way centering member 32 and photosensitive area 66 are optically aligned along axis 69.

Centering member 32 is then connected to the surface of glass cover plate 64 using glue. This however is not a firm bond between centering member 32 and chip housing 62. A video endoscope experiences shakes, shock and other mechanical stresses during usage and handling. Thus, retainer sleeve 46 is slide loosely over centering member 32 and is used to bond centering member 32 and chip housing 62 firmly together, thereby forming an optical seal around video chip 61, and protecting the chip surface and glass cover plate 64 from mechanical stress.

Figure 8:
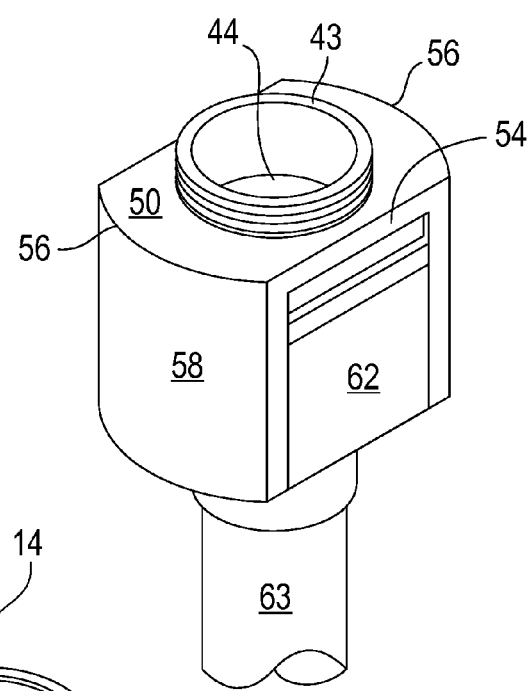
FIG. 8 is perspective view of the retainer sleeve of FIG. 4 coupled to the video chip housing and centering member of FIG. 7.

Specifically, as depicted in FIG. 8, once centering member 32 is glued in place, retainer sleeve 46 is placed over centering member 32 with bottom side 52 and pair of opposing rounded arms 58 facing toward centering member 32. Arms 58 sit loose over pair of opposing rounded edges 42 of centering member 32 and retainer sleeve 46 lowered onto top side 36 of retainer sleeve 46 with cylinder 43 extending up and through oversized opening 60. Opening 60 is oversized to allow retainer sleeve 46 to slide loosely over cylinder 43 of centering member 32 and video chip housing 62, which are offset from one another as described above. Retainer sleeve 46 is then glued in place to video chip housing 62 optically sealing photosensitive area 66.

Figure 9:
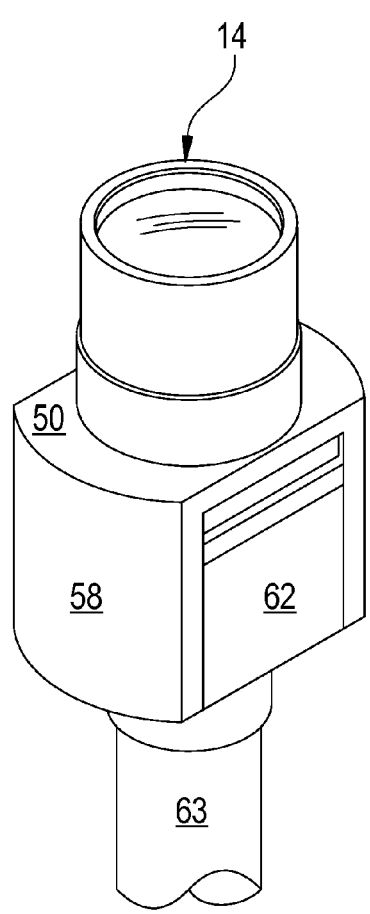
FIG. 9 is a perspective view of the objective barrel of FIG. 2 coupled to the centering member of FIG. 8.
Figure 11:
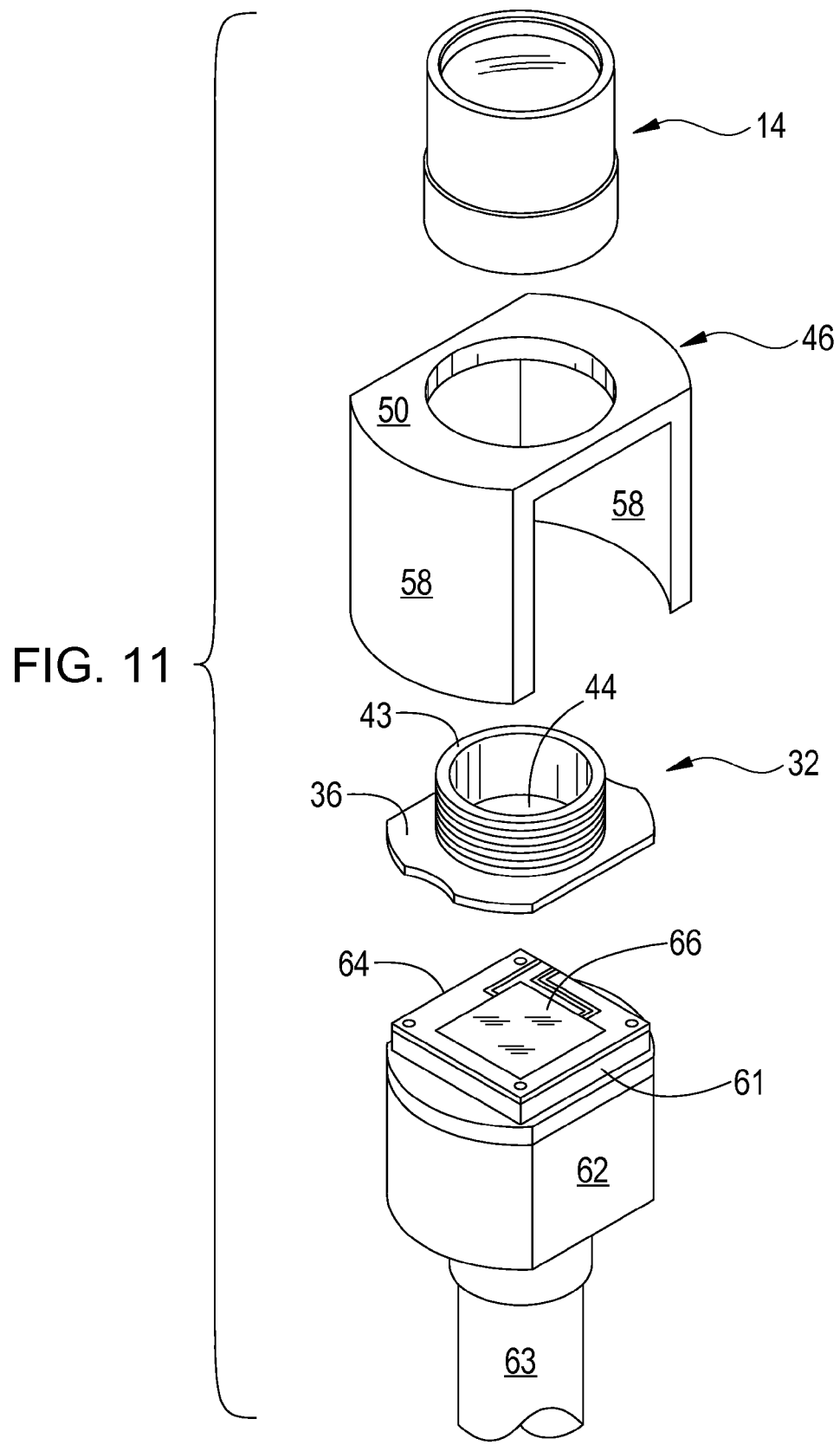
FIG. 11 is an exploded view of the endoscope objective lens centering assembly of FIG. 10.

FIGS. 9 through 11 depict objective barrel 14 coupled to video chip housing 62 and associated video signal cable 63 using centering member 32 and retainer sleeve 46. In particular, objective barrel 14 is coupled to video chip 61 and cable 63 by placing continuous threaded wall 26 of objective barrel 14 onto and over the threaded outer surface of cylinder 43 and screwing them together. This ensures the centering of the objective axis of objective lens 10 relative to photosensitive area 66 on video chip 61. The interaction of the threads also enables an exact focusing of objective lens 10 relative to the plane of photosensitive area 66 simply by rotating objective barrel 14 on cylinder 43 while monitoring an image displayed onto surface 66 through a video monitor connected to video processor and cable 63. Once objective lens 10 is focused, objective barrel 14 is glued to the endoscope objective lens centering assembly to hold it in place.

Figure 12:
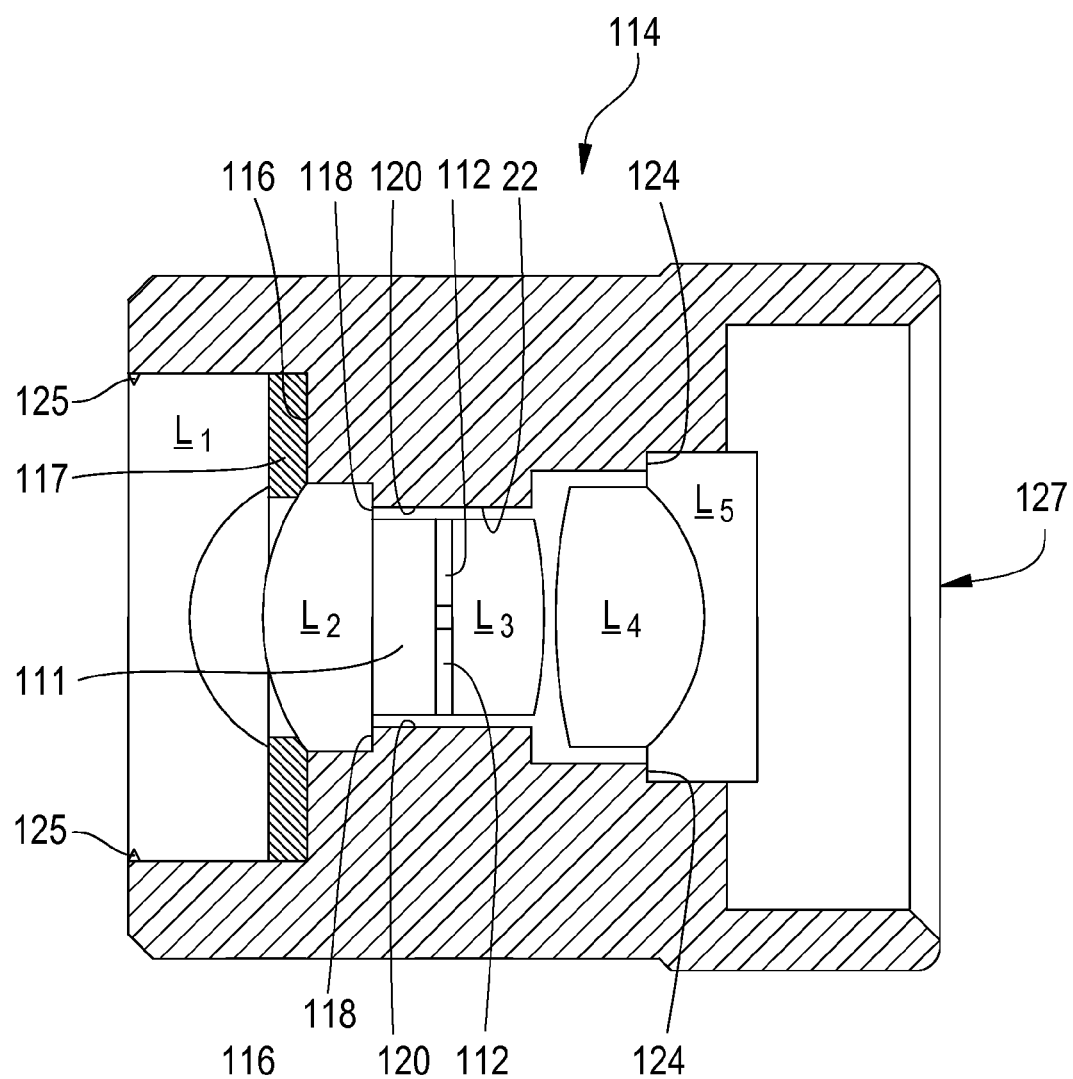
FIG. 12 is a sectional view of an objective barrel in accordance with another preferred embodiment of the present invention.

FIG. 12 depicts an objective barrel 114 in accordance with another preferred embodiment of the present invention. Objective barrel 114 is interchangeable with objective barrel 14 and can therefore be used with the centering assembly of the present invention. Objective barrel 114 includes lenses of the same type as those described above for objective barrel 14 above. Accordingly, objective barrel 114 includes a first lens $L_1$ made of a plan concave lens having a concave surface facing an image side, a second lens $L_2$ made of a plan convex lens having a convex side facing an object side, a third lens $L_3$ made of a plan convex lens having a convex side facing the image side, and an achromatic lens composed of a fourth lens $L_4$ made of a bi-convex lens and a fifth lens $L_5$ made of plan concave lens having a concave surface that faces the object side. This lens assembly diverges from objective lens 10 used with objective barrel 14 in that aperture stop 12 is replaced with a glass plate 111 having an aperture stop 112 which together are placed between and adhered as a single piece to second lens $L_2$ and third lens $L_3$ thereby forming a single unit composed of second lens $L_2$, glass plate 111 having aperture stop 112 and third lens $L_3$.

Successively from the object side to the image side of barrel 14, the interior volume of objective barrel 14 includes a spacer lens seat 116 for positioning and maintaining a spacer 117 within objective barrel 114 and between first lens $L_1$ and second lens $L_2$, a second lens seat 118 for positioning and maintaining second lens $L_2$ within objective barrel 114, the second lens seat 118 possessing no masking properties, a straight portion 120 for containing glass plate 111, aperture stop 112 and third lens $L_3$, an achromatic lens seat 124 for holding fourth lens $L_4$ and fifth lens $L_5$ and an opening 127.

To assemble this objective lens within objective barrel 114, achromatic lens composed of a fourth lens $L_4$ and fifth lens $L_5$ is inserted through opening 127 and glued into achromatic lens seat 124. The single unit composed of second lens $L_2$, glass plate 111 having aperture stop 112 and third lens $L_3$ is then inserted from the object side into barrel 114 with glass plate 111, aperture stop 112 and third lens $L_3$ being located within straight portion 120 with second lens $L_2$ being held within second lens seat 118. Thereafter, spacer 117 is located within spacer seat 116 with spacer 117 being pressed against second lens $L_2$ thereby holding second lens $L_2$, glass plate 111, aperture stop 112 and third lens $L_3$ in place. Holding spacer 117 in place is first lens $L_1$ which is glued in place along point 125 as depicted in FIG. 12. This way, the lens assembly is held within objective barrel 114 by only two gluing steps.

EXAMPLES

Two objective lens designs were used with a chip format of 1.8 mm×2.4 mm with a diagonal of 3 mm and optimized to work best with a cover glass of 0.3 mm to 0.5 mm on the photosensitive area of a video chip. The radius of curvature R (mm) of each lens surface, center thickness of each lens and air gap between the lenses D (mm), and values of refractive index $N_d$ and Abbe number $V_d$ of each lens at the d line of the two endoscope objective lens design are listed in Tables 1 and 2. The Abbe number is a measure of the degree to which light is dispersed when entering a lens. The lower the Abbe number, the greater the dispersion of light, which causes chromatic aberration (color fringing) in the periphery of the lens.

Note that numbers in the table indicate the order from the object side (the fifth surface is a stop) as depicted in FIG. 1.

TABLE 1

| Radius of curvature (mm) | Center thickness (mm) | $N_d/V_d$ |
|---|---|---|
| $R_1$ = Infinity | $D_1$ = 0.30 | 1.881/41.0 |
| $R_2$ = 0.72 | $D_2$ = 0.38 | Air |
| $R_3$ = 1.06 | $D_3$ = 0.60 | 1.697/55.4 |
| $R_4$ = Infinity | $D_4$ = 0.425 | Air |
| $R_5$ (Stop) $\emptyset$ = 0.40 | $D_5$ = 0.025 | Air |
| $R_6$ = Infinity | $D_6$ = 0.45 | 1.754/52.4 |
| $R_7$ = −1.85 | $D_7$ = 0.08 | Air |
| $R_8$ = 2.63 | $D_8$ = 0.85 | 1.744/44.9 |
| $R_9$ = −0.82 | $D_9$ = 0.25 | 1.847/23.6 |
| $R_{10}$ = Infinity | | Air |

The resulting objective lens had a field of view of 155° within a format circle of 2.7 mm, a sum of center thickness before stop of 1.705 mm, a sum of center thickness behind stop of 1.655 mm, a ratio of center thickness before stop to center thickness behind stop of approximately of 1.03, a back focal length of 1.60 mm, a total focal length of 4.96 mm<2× 2.7 mm (format length) and a total imaging system length of 3.36 mm to provide an image forming lens system length that was approximately less than 70% the total focal length.

TABLE 2

| Radius of curvature (MM) | Center thickness (mm) | $N_d/V_d$ |
|---|---|---|
| $R_1$ = Infinity | $D_1$ = 0.30 | 1.881/41.0 |
| $R_2$ = 0.83 | $D_2$ = 0.48 | Air |
| $R_3$ = 1.52 | $D_3$ = 0.60 | 1.786/44.0 |
| $R_4$ = Infinity | $D_4$ = 0.61 | Air |
| $R_5$ (Stop) $\emptyset$ = 0.46 | $D_5$ = 0.05 | Air |
| $R_6$ = Infinity | $D_6$ = 0.45 | 1.881/41.0 |
| $R_7$ = −2.07 | $D_7$ = 0.10 | Air |
| $R_8$ = 2.85 | $D_8$ = 0.80 | 1.717/48.0 |
| $R_9$ = −0.93 | $D_9$ = 0.30 | 1.847/23.6 |
| $R_{10}$ = Infinity | | Air |

The resulting objective lens had a field of view 155° within format circle of 2.7 mm, a sum of center thickness before stop of 1.99 mm, a sum of center thickness behind stop of 1.70 mm, a ratio of center thickness before stop to center thickness after stop of approximately 1.17, a back focal length of 1.60 mm, a total focal length of 5.29 mm<2×2.7 mm (format length) and an imaging system total length of 3.69 mm to provide an imaging system total length that was approximately 68% of the total focal length.

While we have described my invention in connection with a specific embodiment thereof, it is to be clearly understood that this is done only by way of example, and not as a limitation to the scope of my invention, as set forth in the objects thereof and in the appended claims.

It is claimed:

1. An objective lens comprising, successively from the object side to the image side,
    a first plano concave lens having a concave surface facing the image side,
    a second plano convex lens having a convex side facing the object side,
    an aperture stop,
    a third plano convex lens having a convex side facing the image side, and
    an achromatic lens,
    wherein the first plano concave lens, the second plano convex lens, the aperture stop, the third plano convex lens and the achromatic lens are contained within an objective barrel coupled to a centering assembly having a passageway therethrough that is optically aligned with the first plano concave lens, the second plano convex lens, the aperture stop, the third plano convex lens and the achromatic lens.

2. The system according to claim 1 wherein the centering assembly is coupled to a video chip and the passageway is optically centered over a photosensitive area of the video chip.

3. The system according to claim 1 wherein the centering assembly includes a retainer sleeve and a centering member having a cylinder coupled thereto, the retainer sleeve having an opening through which the cylinder extends.

4. The system according to claim 3 wherein the objective barrel is screwed onto the cylinder of the centering member.

5. The system according to claim 3 wherein the centering member is coupled to a glass lens covering a photosensitive area of a video chip.

6. The system according to claim 3 wherein the retainer sleeve includes a sidewall that extends adjacent to a video chip housing.

7. The system according to claim 1 wherein a distance between an object side surface of the first plano concave lens and the photosensitive area is less than twice a diagonal of the photosensitive area.

8. The system according to claim 1 wherein a first distance measured between an object side surface of the first plano concave lens and an image side surface of the achromatic lens is less than 70% of a second distance measured between the object side surface of the first plano concave lens and the photosensitive area.

9. An objective lens comprising, successively from the object side to the image side,
    a first plano concave lens having a concave surface facing the image side,
    a second plano convex lens having a convex side facing the object side,
    an aperture stop,
    a third plano convex lens having a convex side facing the image side,
    an achromatic lens, and
    an image forming lens system length of approximately less than 70% a total focal length of the objective lens.

10. An objective lens comprising, successively from the object side to the image side,
    a first plano concave lens having a concave surface facing the image side,
    a second plano convex lens having a convex side facing the object side,
    an aperture stop,
    a third plano convex lens having a convex side facing the image side, and
    an achromatic lens,
    wherein the refractive index $N_d$ for each of the first plano concave lens, the second plano convex lens, the third plano convex lens and the achromatic lens is greater than 1.695.

11. An objective lens comprising, successively from the object side to the image side,
    a first plano concave lens having a concave surface facing the image side,
    a second plano convex lens having a convex side facing the object side, an aperture stop,
a third plano convex lens having a convex side facing the image side, and
an achromatic lens,
wherein a ratio between a first length measured between an object side surface of the first plano concave lens and the aperture stop and a second length measured between an image side surface of the achromatic lens and the aperture stop is between 1.0 and 1.2.

12. An objective lens comprising, successively from the object side to the image side,
a first plano concave lens having a concave surface facing the image side,
a second plano convex lens having a convex side facing the object side,
an aperture stop,
a third plano convex lens having a convex side facing the image side, and
an achromatic lens,
wherein the first plano concave lens and the achromatic lens are glued into an objective barrel and the second plano convex lens and the third plano convex lens are held therebetween using a spacer.

13. An objective lens comprising, successively from the object side to the image side,
a first plano concave lens having a concave surface facing the image side,
a second plano convex lens having a convex side facing the object side,
an aperture stop,
a third plano convex lens having a convex side facing the image side, and
an achromatic lens,
wherein the aperture stop is coupled directly to a glass plate.

14. The system according to claim 13 wherein the a second plano convex lens, the aperture stop, and the third plano convex lens form a single piece.

15. An objective lens assembly comprising:
a centering assembly having a passageway therethrough, and
an objective barrel containing a plurality of lenses,
wherein the centering assembly is configured for optically aligning the plurality of lenses in the objective barrel with a photo sensitive area that is configured for capturing an image of a substrate formed by the plurality of lenses, and
wherein the plurality of lenses include, from an object side to an image side successively, a first plano concave lens, a second plano convex lens, a third plan plano convex lens, and an achromatic lens.

16. The assembly according to claim 15 including a first distance measured between an object side surface of the first plano concave lens and the substrate that is less than twice a diagonal of an image capturing area of the substrate.

17. The assembly according to claim 15 including a second distance measured between the object side surface of the first plano concave lens and an image side surface of the achromatic lens that is less than 70% of a third distance measured between the object side surface of the first plano concave lens and the substrate.

18. The assembly according to claim 17 including a refractive index $N_d$ for each of the first plano concave lens, the second plano convex lens, the third plano convex lens and the achromatic lens of more than 1.695.

19. The assembly according to claim 15 including a ratio between a first length measured between the object side surface of the first plano concave lens and an aperture stop positioned between the second plano convex lens and the third plano convex lens, and a second length measured between the image side surface of the achromatic lens and the aperture stop that is between 1.0 and 1.2.

20. The system according to claim 15 further comprising an aperture stop that is coupled to and between a glass plate and the third plano convex lens.

21. The system according to claim 20 wherein the second plano convex lens, the glass plate, the aperture stop and the third plano convex lens are combined to form a single piece prior to placement within the objective barrel.

22. A wide field video endo scope objective comprising,
optical elements including a plano concave lens having a concave surface facing an image side, a first plano convex lens having a first convex side facing an object side, a second plano convex lens having a second convex side facing the image side and an achromatic lens,
an aperture stop,
an objective housing containing the optical elements and the aperture stop,
a centering plate coupled to the objective housing and centered over a photosensitive area of a video chip wherein the optical elements are centered to the photo sensitive area, and
a retainer sleeve which slides over the centering plate and is fixed to the centering plate and a housing of the video chip.

23. The objective according to claim 22 wherein the centering plate includes a base plate having a surface, a cylinder extending substantially perpendicularly from the surface, and a passageway extending through the base plate and the cylinder, the cylinder and objective housing being screwed together.

24. The objective according to claim 22 wherein a distance between an object side surface of the first plano concave lens and the photosensitive area is less than twice a diagonal of the photosensitive area.

25. The objective according to claim 22 wherein the refractive index $n_d$ for each of the optical elements is greater than about 1.695.

26. The objective according to claim 22 including a first distance measured between an object side surface of the first plano concave lens and an image side surface of the achromatic lens that is less than about 70% of a second distance measured between the object side surface of the first plano concave lens and a substrate.

27. The objective according to claim 22 wherein a ratio between a first length measured between an object side surface of the first plano concave lens and the aperture stop and a second length measured between an image side surface of the achromatic lens and the aperture stop is between about 1.0 and about 1.2.

28. The objective according to claim 22 wherein an outer lens on the object side and an outer lens on the image side of the objective housing are glued in the objective housing and arranged to hold inner lens there between utilizing a mechanical spacer.

* * * * *